W. P. THOMPSON.
FLYING MACHINE.
APPLICATION FILED NOV. 29, 1907.
1,192,954.
Patented Aug. 1, 1916.
3 SHEETS—SHEET 1.
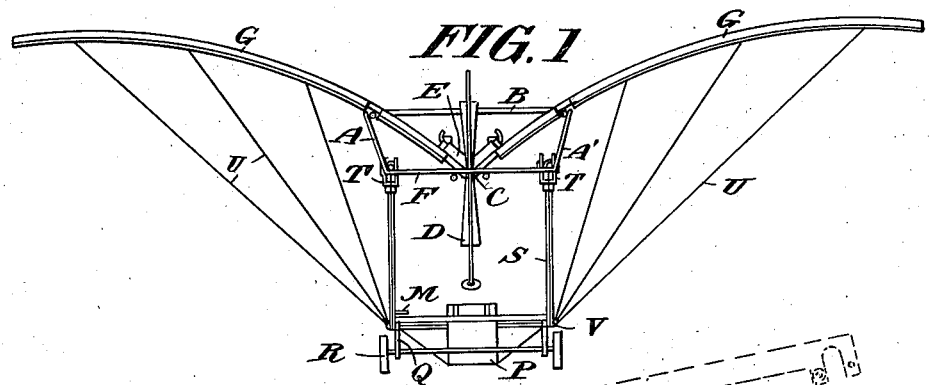
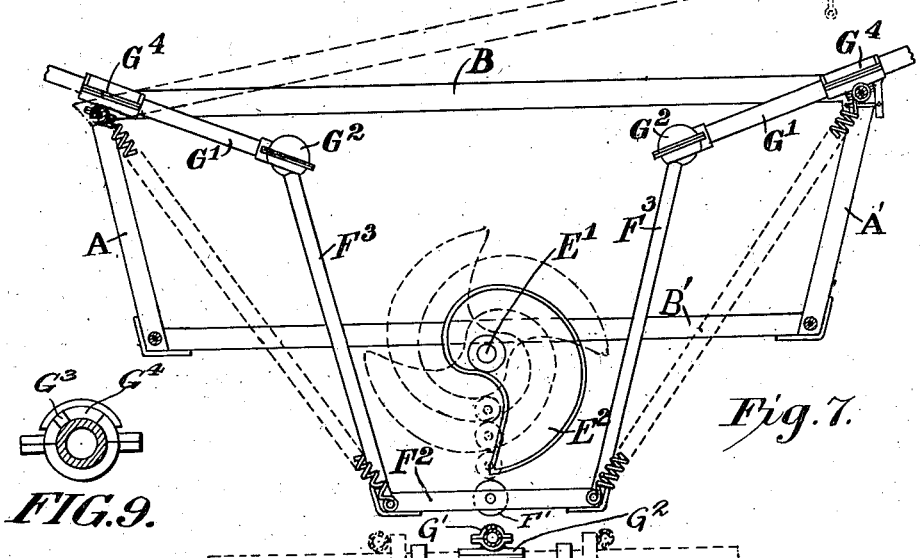
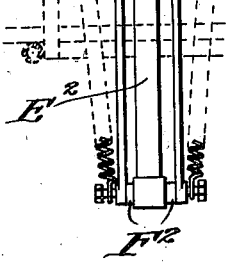
Witnesses
Chas Leslie
H. L. Dixon
Inventor
W. P. Thompson

W. P. THOMPSON.
FLYING MACHINE.
APPLICATION FILED NOV. 29, 1907.

1,192,954.

Patented Aug. 1, 1916.
3 SHEETS—SHEET 3.

Witnesses

Inventor

UNITED STATES PATENT OFFICE.

WILLIAM P. THOMPSON, OF LIVERPOOL, ENGLAND.

FLYING-MACHINE.

1,192,954.          Specification of Letters Patent.          Patented Aug. 1, 1916.

Application filed November 29, 1907. Serial No. 404,321.

*To all whom it may concern:*

Be it known that I, WILLIAM PHILLIPS THOMPSON, a subject of the King of Great Britain, residing at Liverpool, in the county of Lancaster, in the Kingdom of England, civil engineer, have invented certain new and useful Improvements in or Appertaining to Flying-Machines, for which application has been made in Great Britain No. 27312, dated November 30, 1906.

This invention has for its object a flying machine that will be automatically balanced to a very great extent by the horizontal displacement of the car. It can be made of very different sizes, and can have a greater or lesser number of planes or of wings than those shown, and either the wings or the screw in some instances be altogether dispensed with, but I prefer to have both.

Figure 2:
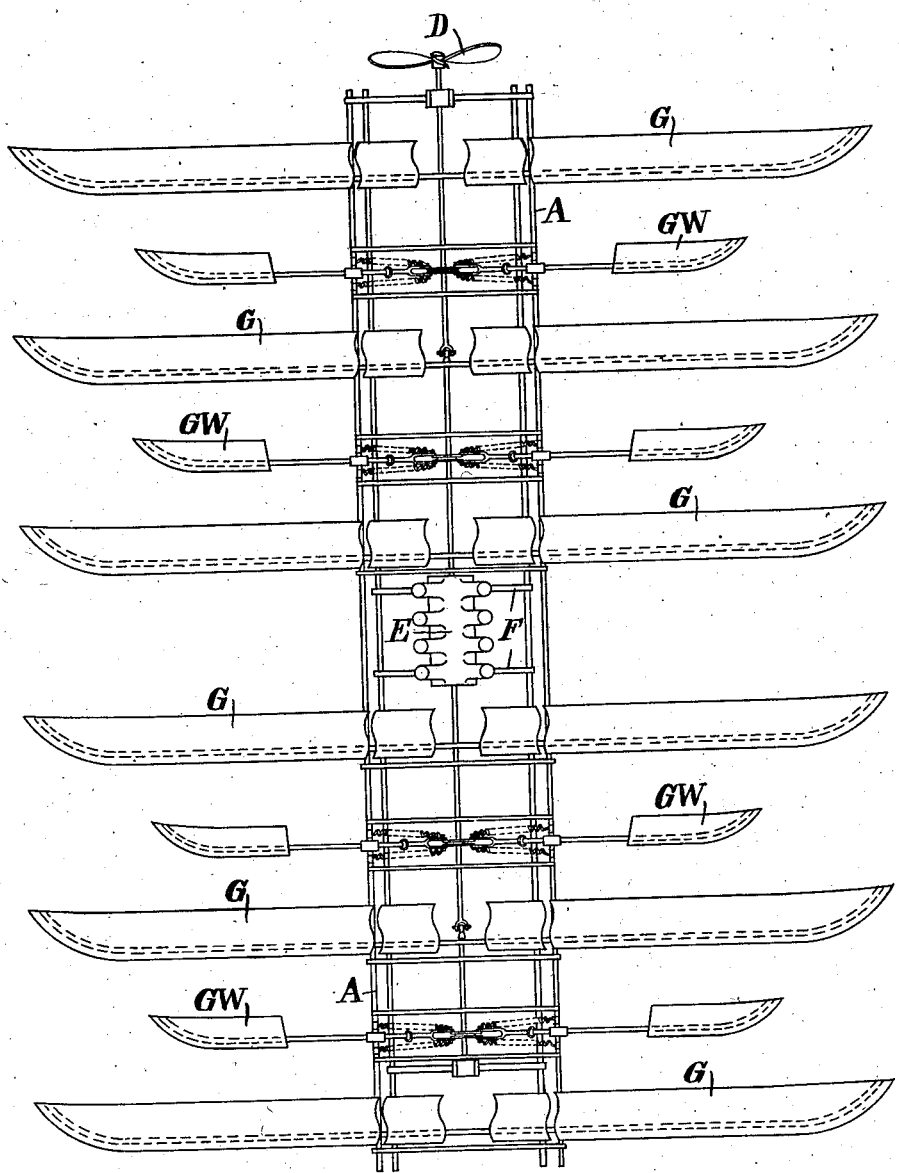
Figure 3:
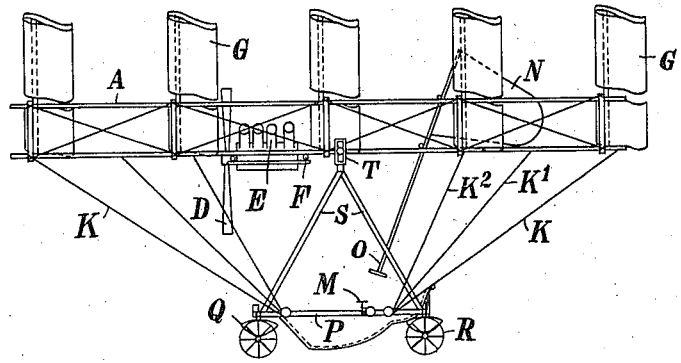
Figure 4:
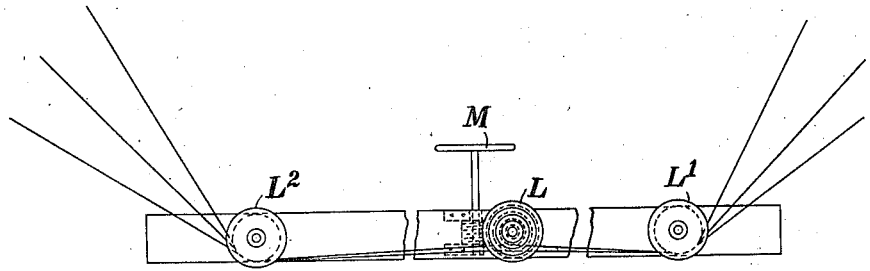
Figure 5:
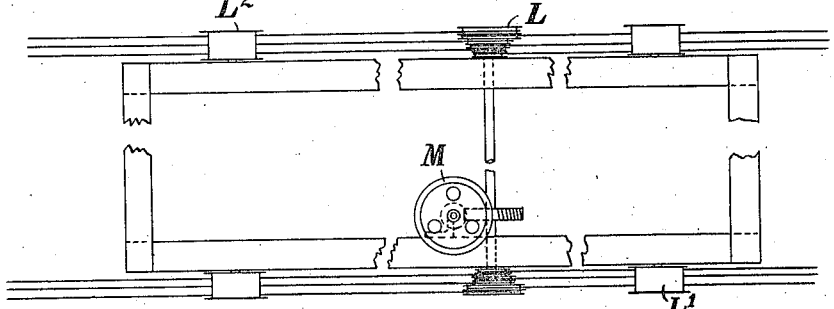

Figure 1 shows an end view of my device with the wings omitted. Fig. 2, a plan of my machine with the car and the lines connecting it with the superstructure omitted. Fig. 3 is a side elevation of a machine without wings. Fig. 4 shows an elevation of part of the platform of the car showing the guiding device. A precisely similar device is used for moving the car laterally as shown by handle M in Fig. 1. Fig. 5 a plan view of same, Fig. 6 a section of an aeroplane when formed on a large scale, having an aluminium tube G' and steel or other like feathers J. Fig. 7 an enlarged transverse section of the central part of the superstructure showing the cam and springs which work the wings. Fig. 8 the same parts as Fig. 7, taken at right angles thereto. Fig. 9 a transverse section of the wing socket showing the stop. Fig. 10 a section of a beetle's wing case.

In the figures A—A'—are two girders. These are a little out of the perpendicular as shown, but they can be placed perpendicular if desired. They are spaced apart below by bars B' pivoted at each end to the base part of girders A A' and hook bars B pivoted on the righthand side to girder A, and hooked on to girder A'. The top bar can consequently be hooked or unhooked when if the junctions between the pairs of aeroplanes at C, Fig. 1, be hinged, the aeroplanes can be brought up into a nearly vertical position, and thus the machine be sufficiently narrow to be drawn on the wheels through a narrow street or alley. The girders A in large machines are preferably nearly perpendicular.

D is a screw made to propel the machine.

E is the engine for driving the screw and also for driving the mechanism of the wings. This engine is supported on a small platform suspended from the two girders by the bars F, Fig. 2. At intervals along the top member of each girder and sometimes along each bottom member and even at intermediate points I arrange light transverse aeroplanes G and wings G W. The midrib of these aeroplanes can be made of celluloid or the like, or of aluminium tube or even of bamboo or hollow wood built up or other like construction.

Figure 6:

A section of my most improved design of aeroplane or wing is shown in Fig. 6 in which G' is the wing shaft or tube, H a steel clamp, J steel, wood or other feathers on which canvas is stretched, fastened by said steel clamp to the tube, and J' a further canvas top. These aeroplanes can be perfectly horizontal, and parallel with the top of the girder, but I prefer them to be slightly curved as shown, and set at an angle of a few degrees with the girder and in pairs attached to each other by means of a hinge. In place of some of these aeroplanes and preferably alternating with them I use pairs of wings G W each pivoted by a universal joint on the girder as shown in Fig. 2, the universal joint being shown in Fig. 7, $G^4$. Each wing has a sudden beat downward, and a slow beat upward by means of the mechanism hereafter explained. The wings are arranged to freely oscillate on their axes through a short distance so that the moment the extension of the main blade of the wing beyond the girder is pressed down, the wing shall in cross section slope downward and forward until stopped by a stop but when the wings are forced upward, the main shaft of the wing will rotate as far as the stop will allow, and thus the wing during its entire upward stroke will be pointing upward and forward.

In the cross section shown in Fig. 9, $G^3$ is a feather attached firmly to the tube of the wing shaft, $G^4$ a hiatus in the bearing. By this means the wing has a free rotary motion for the full length of this hiatus. Wings are only required in the larger aerostats. In very small flying machines for a single man, a screw is sufficient, but for large ones, where there can be numerous wings arranged at preferably uniform intervals in a considerable length of girder, wings are very desirable, and the strains are thus reduced to a minimum as the actuating mechanism of the wings can be evenly spaced around the circle of the main shaft. Further, the wings are supplied with springs, which when the wing is rising upward, are compressed or expanded, and these springs when released produce the downward stroke. The mechanism for doing this is shown in Figs. 7 and 8. In these G' is the wing shaft, G² a joint, F³ a link, and F² are two plates linked to links F³. F' is a roller rotating in bearings in these two links F². The mode of action of this part is as follows;—The roller F' being pressed down by the cam E², on the shaft E' to the point shown, the wing is raised for a beat. As the shaft revolves therefore the roller is released, the springs suddenly draw up the links F² and thus forcibly and suddenly pull up the wing shaft ends causing a downward beat of the wings. The unbalanced pressure on the feathers of the wing causes the wing shaft to turn in its bearings as far as the stop will allow, and the wing strikes downward and backward with its feathers pointing upward and backward about 35 to 45 degrees. The shaft continues to turn and pulls the wing up, the feathers sink till they are about four degrees below the horizontal when they are stopped by the stop. The wing now becomes an aeroplane, slowly rising till the springs are again liberated. By spacing the gear cams E² at even angular distances around the engine shaft the strain caused by the springs is evenly distributed. It is obvious that in place of the spring operating the downward beat, the gearing could be arranged so that the engine would operate the beat and the spring bring the wing slowly back. From each end of the main girder A I suspend a wire, cord, rope or chain K, and from intermediate points other like lines K' K², etc. All these lines pass over a drum or drums L on a transverse shaft in the lower carriage hereafter described and two small subsidiary drums L' L². They are preferably riveted or fastened in the center to the drums L or have several laps around it, and these drums L are proportioned so that there shall be the same pull on all the wires or ropes for all positions of the drums. On the shaft of these drums is a worm wheel and on a hand wheel shaft M the worm, so that the operator sitting in the carriage can rotate these drums. Further, from one or more of the aeroplanes on each side and from the girders I may bring wires U from central points or intermediate points and from near the ends to rollers or reels V or other points of attachment on the sides or the bottom of the carriage with any desired mechanism for tightening them up or slackening them off such as a longitudinal shaft and drum like the transverse ones described above. Thus the weight of the carriage is distributed over all the aeroplanes direct or through the girders, and as it is supported from both sides, the entire carriage tends to keep the aeroplanes on the same level, for if the main plane of the flying machine assumes an angle with the horizon the greatest weight tends to pull on the higher side, and thus there is a tendency for it to regain the horizontal. The operator and any passengers and crew stop in the lower carriage.

The aeroplanes instead of being the section shown in Fig. 6, which was intended more for the section of wings can be somewhat in the section of a beetle's wing case, see Fig. 10, the general cross contour being a few degrees from the horizontal in an upward and forward direction, and the whole concave downward, but the fastenings to the girders are preferably adjusted so that with light loads and quick speeds, the aeroplanes can be fixed with their cross sectional planes more nearly parallel with the girders in cross section, than with slow speeds and heavier loads.

Any ordinary device for changing the angle will be used. I have therefore not shown any special one. The wings are substantially of the cross section shown in Fig. 6, except that the fine rear end is pliable and elastic, and consequently may bend up or bend down according as the wing is descending or ascending.

The engine and shaft when there is only a screw propeller must be kept as nearly as possible in the line of the center of resistance of the entire machine to forward travel, but where there are wings also the center of this shaft is preferably placed below the center of resistance.

N is a tail rudder for guiding the machine, worked by the handle O. This handle is shown diagrammatically attached to the rudder, but in practice it will probably be found preferable to have it alongside the worm wheel M as in an ordinary automobile.

P is a carriage supported by the usual spring devices Q on four wheels R. At each side of this carriage are two beams S carrying at their top a vertical slotted guide T in which works a pin firmly fixed to the lower member of the main girder A. The upper or flotation structure can thus rise independently of the carriage as far as the wires or ropes suspending the carriage will allow. The pin on the girder can be arranged to have a free movement of translation longitudinally within suitable limits so that when the wheel M is used for guiding this pin will adjust itself to the position of the guide T.

The mode of action is as follows; During the downward stroke the wings press the air backward, but in the upward stroke they rise like aeroplanes owing to their having an upward forward slope, in fact they act on what I believe to be the principle of a bird's wing. These wings, or wings and a screw, or a screw alone, whichever be used, when put in position cause the whole device to run along the ground on the wheels R until the superstructure rises. The motor still propels the carriage forward which if desirable can be provided with a self propelling mechanism (but this will probably rarely be required) until the carriage itself rises. In flight, if a descending course be desired, the carriage is swung forward on the longitudinal ropes or chains K K', etc., while if it be desired to rise, the carriage is brought more to the rear in each case by turning the handle M. If it be desirable to have a lateral movement the rudder is used, though it would be possible to arrange longitudinal rollers and a similar device to M, in which case steering could be effected by moving the carriage laterally on the lateral wires or the like, the principle of balancing by the carriage being that the latter carrying a large amount of weight is suspended from four points, front, rear and on each side, and so must keep all these ropes taut, and this it can only do when the flying machine is in the exact plane due to the position of the carriage on the ropes for the time being, for of course if the plane of the upper superstructure becomes oblique, a greater strain is put on the ropes from the higher point, and less on those from the lower. It will be seen therefore that the more weight is placed on the carriage and the deeper the carriage is below the superstructure, the more stable and balanced the machine will be, but as it is desirable that the screw should be tolerably near the plane of the aeroplanes and yet should be in the center of resistance a limit must be put to the distance of the center of gravity of the carriage below the plane of the aeroplanes.

The engine can be as shown in line with the main shaft and carried by the girders or be in the lower carriage and connected by straps with idle pulley to take up slack or by gear chains. In actual starting the upper body rests on the lower carriage, and on the bottoms of the guides T all the wires being somewhat slack. The wings if used are thus high enough to be clear of hitting the ground.

Although I have described the carriage as connected to the superstructure only by ropes or wires, it is obvious that this is not absolutely necessary so long as the center of gravity of the carriage is much below the center of gravity of the superstructure and can be moved horizontally relative to the superstructure, and provided the carriage raises the superstructure high enough for the wings not to be impeded by striking the ground in starting flight. The carriage should be widely enough based so that there will be no fear of the structure toppling over when at rest or when starting or stopping. The aeroplanes when at all in use will assist also in steadying the machine, and when the machine is being drawn along the road, and the bars B are unhooked, and the wings placed vertical, the girders can be drawn toward each other, and this itself will as it were furl the wings so that it will resemble those of a butterfly when at rest. Any mechanism such as a rope wound around both members and twitched tight by a bar can be used for drawing the members near together.

I claim as my invention:—

1. The combination in a flying machine of an upper framework, a plurality of narrow transverse aeroplanes fixed thereto extending out at right angles to the axis on each side, and at least three times their own width apart from each other, propelling mechanism for driving the upper structure through the air, a sub-structure, means for suspending the latter flexibly from the upper structure, distance pieces between the two structures, and means for altering the angle of suspension in any direction, whereby the inclination of the aeroplanes is simultaneously altered in reference to the substructure.

2. In a flying machine, the combination of a superstructure formed of two normally substantially parallel girders hinged together at the bottom with disconnectible means for holding them together at the top, a plurality of long narrow transverse aeroplanes projecting across them, and attached thereto, and hinged at the longitudinal center line of the machine, whereby when the two girders are disconnected at the top and brought nearly together, the aeroplanes stand up substantially vertical like the wings of a butterfly when it has alighted.

3. In a flying machine, the combination of two girders hinged at the bottom and braced together by removable means at the top, a series of long narrow aeroplanes on each side fixed rigidly to the respective girder and spaced widely apart, whereby by turning each girder on its axis, its respective aeroplanes can be moved from a more or less horizontal to a more or less vertical position.

4. In a flying machine, the combination of two girders hinged together at the bottom and braced together at the top, a series of pairs of long narrow aeroplanes spaced widely apart and crossing these girders at right angles and attached to each of them, wings pivoted on the girders at intervals between the aeroplane and means for flapping these wings for the purpose of driving the flying machine forward in the direction of the joint axes of the girders.

5. In a flying machine, a longitudinal framework consisting of two girders hinged at the bottom, and adjustable distance pieces at the top, a series of aeroplanes fixed thereto, a propeller, a main shaft with driving gear in the girder, and a car suspended from the aeroplanes and girder.

6. In a flying machine, the combination of two girders braced together with their upper members some distance apart, transverse narrow aeroplanes rigidly attached to said girders and wings pivoted on said girders, a longitudinal shaft carried in bearings between the girders and wing beating mechanism operated by the said shaft, and a motor operating said shaft.

7. The combination of a longitudinal framework, pairs of aeroplanes at intervals along the framework, extending out laterally on each side, and attached rigidly thereto, pairs of wings at intervals pivoted to the framework, a longitudinal main shaft carried by the framework, an engine driving the main shaft, and mechanism on said main shaft actuating each pair of wings synchronously for slowly raising and suddenly releasing them for the down-stroke, springs for causing the return stroke, and means for allowing the wings a limited angular rotative movement.

8. The combination of a longitudinal framework, wings at intervals pivoted to the framework extending out laterally, an engine, a main shaft driven by that engine, a separate variable motion device driven positively by said shaft, connected with each pair of wings, whereby the wings can be slowly drawn back and then rapidly flapped, and means for allowing the wings a limited angular rotary movement.

9. In a flying machine, the combination of a longitudinal girder framework, a series of aeroplanes fixed thereto, and a series of pairs of wings pivoted on said girder framework and a main shaft in the longitudinal centerline of the framework carrying a separate positively propelled device for each pair of wings, whereby these are obliged to work synchronously with each other, and means for rotating the said shaft.

10. The combination of a longitudinal framework formed of two parallel girders braced together, a series of long narrow transverse aeroplanes fixed thereto and of pairs of wings pivoted on said girders and free to move axially within certain limits, and more than their own width apart from any other plane whereby the air compressed by one wing can expand before meeting another plane, a longitudinal rotating shaft and means on that shaft for giving a beating motion to those pairs of wings.

11. The combination of a framework formed of two substantially parallel girders, a series of pairs of aeroplanes, rigidly fixed on the framework, a wheeled car suspended from said framework when at rest, and means for bringing all the aeroplanes into substantially vertical position when at rest, and of rigidly fixing them into the substantially horizontal position when not at rest.

12. In a flying machine, the combination of a girder superstructure, a series of transverse narrow aeroplanes attached thereto, a strut separating the superstructure from the car when at rest, at a transverse line near the center of the superstructure, lines from opposite extremities of the aeroplanes to the car, and lines from the extremities fore and aft of the superstructure to the car, with means for varying the position of the car relative to these lines, whereby the superstructure can rest on the car when not flying, and yet the car be free to be moved relative to the planes by manipulating the lines aforesaid during flight, and during flight the entire weight of the car is carried by said lines, while when at rest, the weight is carried mainly by the strut.

13. In a flying machine, the combination of a longitudinal girder framework having a series of narrow transverse aeroplanes fixed thereto at least three times their breadth apart, a driving mechanism in approximately the horizontal centerline, a car suspended by flexible means from the superstructure, and carrying a large part of the weight, means for keeping the relative distance of the car and superstructure practically constant during flight, and also constant at rest at a slightly lesser distance apart, and means for guiding the machine by changing the position of the car both longitudinally and transversely relative to the superstructure.

14. The combination of long narrow transverse aeroplanes, a girder framework below, to which said aeroplanes are rigidly attached, wings pivoted on that framework, an engine, shaft and variable gear on that shaft carried by the framework, giving a slow upward and a sudden downward stroke to the wings, and at the same time a small angular change of position rotary to their axes and a car below suspended from the framework, with means for moving that car in any direction horizontally, whereby the inclination of the entire set of wings and aeroplanes can be simultaneously altered at will.

In witness whereof, I have hereunto signed my name this 20th day of November, 1907, in the presence of two subscribing witnesses.

WM. P. THOMPSON.

Witnesses:
 CHARLES LESLIE,
 RICHARD W. WILLIAMS.